United States Patent [19]

Toalson

[11] 4,129,037
[45] Dec. 12, 1978

[54] APPARATUS FOR WEAR DETECTION

[76] Inventor: David C. Toalson, 21119 Park Wick, Katy, Tex. 77450

[21] Appl. No.: 779,769

[22] Filed: Mar. 21, 1977

[51] Int. Cl.$^2$ .......................................... G01M 15/00
[52] U.S. Cl. ...................................... 73/151; 73/117.3
[58] Field of Search ...................... 73/151, 117.3, 116; 364/431

[56] References Cited

U.S. PATENT DOCUMENTS

| | | | |
|---|---|---|---|
| 3,237,448 | 3/1966 | Howell et al. | 73/117.2 X |
| 3,362,217 | 1/1968 | Evans et al. | 73/116 |
| 3,379,056 | 4/1968 | Ellison | 73/115 |
| 3,517,177 | 6/1970 | Crowell | 73/116 X |
| 3,584,507 | 6/1971 | Hohenberg | 73/116 |
| 3,774,445 | 11/1973 | Rundell et al. | 73/151 |
| 3,884,071 | 5/1975 | Howeth et al. | 73/151 |
| 3,950,985 | 4/1976 | Buchwald et al. | 73/116 |
| 4,051,720 | 10/1977 | Barrington | 73/116 |

FOREIGN PATENT DOCUMENTS 417818 7/1974 U.S.S.R. ...................................... 364/431

*Primary Examiner*—Jerry W. Myracle
*Attorney, Agent, or Firm*—James L. Jackson

[57] ABSTRACT

Method and apparatus for measurement of expected wear on a wide range of mechanisms that are subjected to a plurality of wear inducing factors. Where detection of wear is desired for certain components of oilwell drilling fluid piston pumps the method may be accomplished by recording a function of the product of piston speed, pump generated fluid pressure and time. Means are provided for monitoring signals representing pump pressure and speed or cycles, multiplying these signal quantities and obtaining a product which is a function of hydraulic horsepower hours. This product is then scaled to a convenient degree, and totalized. The invention is applicable to many types of mechanical and electro-mechanical devices including centrifugal and positive displacement pumps, compressors, and to various types of engines and motors. The invention provides a means to record the work output for any machine wherein it is possible to obtain electrical analog signals representing speed or cycles and torque or pressure.

16 Claims, 3 Drawing Figures

APPARATUS FOR WEAR DETECTION

FIELD OF THE INVENTION

This invention relates generally to wear detection devices and more particularly to means for accumulating the expected results of a plurality of wear inducing factors such as time, speed, pressure, temperature, etc. and developing a signal representing the expected accumulated wear of a mechanism responsive to cumulative wear inducing factors.

BACKGROUND OF THE INVENTION

While the present invention has application to a wide range of mechanical and electro-mechanical devices for the purpose of simplicity and clarity the invention will be discussed particularly as it applies to pumps. It is not intended to limit this invention to pumps or any other particular class of mechanisms.

In drilling a well for oil or gas, it is normal to employ piston type pumps (commonly referred to as "mud pumps") to circulate drilling fluid through the drill stem. The circulating drilling fluid serves a multitude of purposes including cooling and lubricating the drill bit and stem, removing drill cuttings and transporting them to the surface, preventing ingress into the hole of unwanted material such as oil, water, and gas, and owing to the weight and head of the column of fluid, in equalizing downhole pressure, thus minimizing the possibility of a well blowout.

Owing to importance of the circulating drilling fluid in the efficiency and safety of drilling for oil and gas, it is obvious that the mud pump which provides the circulation is equally important.

The mud pumps generally in use at the present are direct acting piston type pumps. These pumps fall into two general categories, i.e. two cylinder-double acting pumps typically referred to as duplex pumps and three cylinder single acting pumps, commonly referred to as triplex pumps.

Although different in some respects, both types of oilwell mud pumps have comparable maintenance problems. The components in the pump's fluid end, that is to say, the pistons, cylinder liners, valves, and valve seats (also rods and rod packing in duplex pumps) require renewal at rather frequent intervals, because of the abrasive nature of the liquid medium being handled. It is most important that the operator of the equipment be able to predict with reasonable accuracy the time at which these fluid end parts are likely to fail. In this way he may schedule pump maintenance during some safe, convenient period in the drilling program, for example while performing an operation for which the pump is not required. Without a suitable wear detecting device, the operator is likely to exchange expensive fluid end parts far too often, with attendant losses in drilling time and revenues, or run the risk that the pump will fail at some time crucial to the operation or safety of the well drilling operation.

It has been customary for some years in the industry to apply hourmeter clocks to the mud pumps, and thus record the quantity of hours which a particular pump has operated. It is well known, however, that inasmuch as the mud pumps operate over a wide range of speeds and pressures, the prediction of parts failures based on running time in clock hours is highly unreliable. In order to accurately predict failure of the fluid end parts of these pumps it is desirable to measure the work which has been expended through the part. The work, which is proportional to wear, which is expended by the pump is typically the product of three variables; namely speed, pressure, and time. Other variables, such as temperature, for example, may also be considered, depending upon the character of mechanical or electro-mechanical device under consideration. The present invention effectively provides means for measuring and recording the products of the variable wear inducing factors to which the pump or other apparatus is subjected during operation and thus provides the operator of the equipment with reliable signals representing the expected wear of the equipment that has occurred. Maintenance can be accurately and efficiently scheduled to insure optimum utilization of the equipment and to insure minimum repair induced down time of related equipment.

THE PRIOR ART

Wear detector mechanisms for mechanical devices related to the drilling of, or production from oil wells is exemplified by U.S. Pat. Nos. 3,614,761 of Rehm, et al., 3,908,761 of Patterson, et al. and 3,951,209 of Gibbs. Simple horse-power hour-meter devices have been in existence for a considerable period of time as exemplified by U.S. Pat. No. 896,755 of Picht. Wear detection in rotary devices such as engines and compressors are exemplified by U.S. Pat. Nos. 2,159,236 of Uher, 3,379,056 of Ellison and 3,463,384 of Kilbane. Recording devices for recording components reflecting power and time are also old in the art as exemplified by U.S. Pat. No. 2,645,118 of Andresen which shows a power-time recorder.

It is a desirable feature of the present invention to provide a novel method and apparatus for detecting various wear inducing factors for mechanical and electro-mechanical mechanisms and for providing a display reflecting the product of these wear inducing factors.

It is also an important feature of the present invention to provide a novel method and apparatus for obtaining analog signals from transducers that detect work related activities such as time, pressure, force, etc. and processing the analog signals to yield information identifying the expected wear that might have occurred during operation of the mechanism.

Among the several features of the present invention is contemplated the provision of a novel method and apparatus for receiving transducer signals relating operational parameters of a mechanical or electro-mechanical device such as operating cycles, fluid pressure, etc. The method includes selectively dividing the intermittent transducer signals, such as cycles, by predetermined selected numbers with selection of the numbers being determined by comparator circuitry that compares a variable transducer signal, such as pressure, with a predetermined reference voltage.

It is an even further feature of the present invention to provide the novel wear detection circuit for mechanical and electro-mechanical devices whereby digital read-out means is employed to provide a cumulative indication of the amount of wear that might have occurred during operation of the device.

It is also a feature of the present invention to provide a novel wear detection system for mechanical and electro-mechanical devices that is simple in nature, reliable in use and low in cost.

Other and further features, advantages and objects of the present invention will become apparent to one skilled in the art upon full consideration of the present disclosure. The form of this invention, which will now be described in detail, illustrates the general principles of the invention, but it is to be understood that this detailed description is not to be taken as limiting the scope of the present invention.

SUMMARY OF THE INVENTION

A preferred embodiment of the present invention may conveniently take the form of wear detector apparatus that includes transducer means connected to a particular apparatus for which operational wear is to be detected. The transducers may take any convenient form capable of developing an electrical signal such as an analog signal responsive to operation of the mechanical or electro-mechanical device involved. For example, where the mechanical device is a mud pump, such as is typically utilized in conjunction with the drilling of deep wells, one transducer may detect the fluid pressure output of the pump and render an analog signal responsive thereto. Another transducer may be a tachogenerator that develops analog signals responsive to the operating speed of the pump. The analog signals from the transducers may then be filtered to pass the D.C. current of the analog signals while rejecting noise or other high frequency phenomenon which may be inductively coupled to the transducer circuit. The analog signals then may be appropriately scaled, such as by a potentiometer or other suitable signal scaling device for reception by a multiplier circuit that yields a product of the scaled analog signals from the transducers. The product signal from the multiplier may then be further treated by means of a voltage-to-frequency converter that functions to generate a square wave the frequency of which is proportional to the input voltage received from the multiplier circuit. The range of frequency of the converter circuit may be determined by a R.C. time constant circuit that may be employed to develop a frequency range for the voltage-to-frequency converter circuit that provides an output signal that relates to the horsepower output of the mechanical device. This output frequency signal then may be divided by a fixed constant that is preset corresponding to desired work output of the mechanical device. The output signal of the divider circuit may then be amplified to enable the output signal to operate a digital counter or other suitable recording device that accumulates a total representing the total work accomplished during operation of the mechanical device.

Although transducer generated analog signals may be effectively employed in conjunction with the teachings of the present invention to develop a signal representing work done by the mechanical device, it is not necessary that transducer signals be analog signals. For example, a mechanical device having cycles of operation during use may be provided with a switching mechanism that yields a signal at each operational cycle. Another transducer may be employed in conjunction with the mechanical device to develop an analog signal such as a pressure signal, for example. After conditioning the cycle signal developed by the transducer to eliminate noise and other extraneous signals, this signal may be divided by selective numbers, depending upon the character of the signal received from the pressure transducer. The analog signal, which is a variable voltage, then may be compared to a reference voltage and may be utilized for operation of the selection means that selectively divides the output signal of the cycle transducer. The output signals from the comparator circuit may function to control relays or solid state switches that control selective signal division by the divider circuits. The output of the divider circuits then may be amplified to increase the voltage of the output signal sufficiently for operation of a digital counter or other suitable signal recording device. The operator of the machinery for which wear detection is desired will periodically inspect the digital counter indicia, and when its value reaches a predetermined minimum, the operator will be made aware that the machinery will soon be in need of maintenance. Maintenance then may be scheduled at the next convenient time when the machinery is not being used.

BRIEF DESCRIPTION OF THE DRAWINGS

So that the manner in which the above recited features, advantages and objects of the present invention, as well as others which will become apparent, are attained and can be understood in detail, more particular description of the invention, briefly summarized above, may be had by reference to the embodiments thereof which are illustrated in the appended drawings, which drawings form a part of this specification.

It is to be noted however that the appended drawings illustrate only typical embodiments of the invention and are therefore not to be considered limiting of its scope, for the invention may admit to other equally effective embodiments.

In the drawings:

FIG. 1 is a schematic electrical circuit shown in block diagram form and illustrating the use of analog signals from a pressure transducer and tachogenerator, which analog signals may be processed in accordance with the method of the present invention to provide a digital counter with an output signal representing work that was done by a pump mechanism.

FIG. 2 is an electrical schematic circuit shown in block diagram form illustrating a modified embodiment of the present invention and showing the use of electrical transducer signals that are other than analog and which may be electrically processed in accordance with the teachings of the present invention to provide a digital counter with signal representing work done by the pump mechanism.

FIG. 3 is a graphical representation of pressure transducer performance considering transducer voltage and pump pressure correlated with transitional set points.

Figure 1:
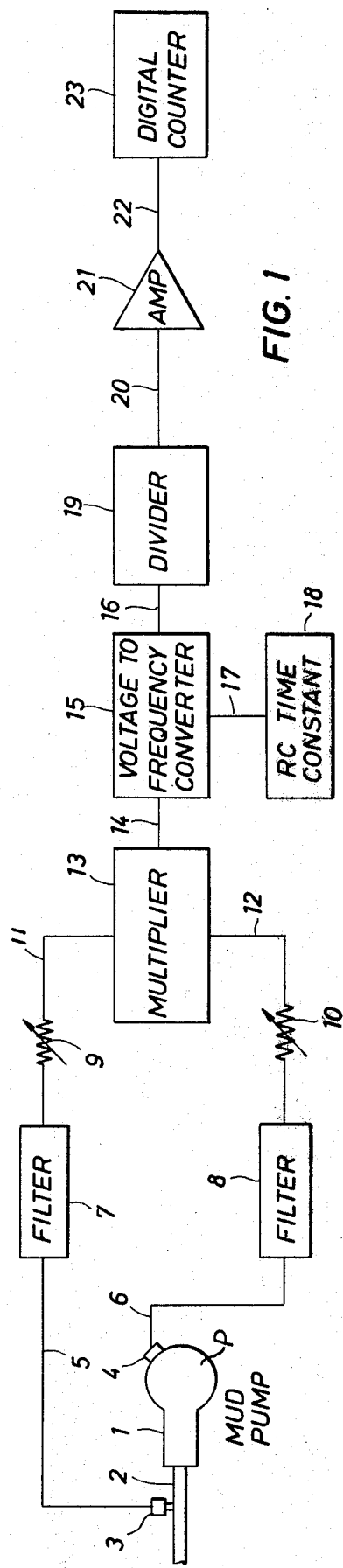

Referring now to the drawings and first to FIG. 1, there is shown a mechanical device such as a mud pump for which a work output related signal is desired for determining when the pump has been used sufficiently for repair thereof to be in order. The mud pump, of course, is a representative mechanical device for which wear is detected. Wear detection of many other mechanical and electro-mechanical devices is readily possible through employment of the present invention.

In FIG. 1, an electrical circuit is presented in block schematic form representing the preferred circuitry for detecting the expected wear of a mud pump 1 which is a high pressure mud pump having appended to its discharge line 2 a pressure transducer 3. The pressure transducer 3 is of a type well known in the industry which, by means of a strain guage and appropriate amplifier, converts a fluid pressure signal of such as 0–5000 p.s.i., for example, to a proportional d.c. voltage such as 0–5 volts. One such transducer is the type DV high output transducer, manufactured by BLH Electronics, 92 Fourth Avenue, Waltham, Mass. 02159.

The pressure analog signal, which is proportional to the output pressure of the pump 1 is transmitted by conductor system 5 to line filter 7. Filter 7 is a simple balanced line pi-network low pass filter well known to those skilled in the art. The function of this filter is to pass the d.c. pressure analog signal while rejecting noise or other high frequency phenomena which may be inductively coupled into the transducer conductor 5.

The filtered d.c. output from the filter 7 is fed to poteniometer 9 where it is scaled to an appropriate level (usually 3.16 volts when the pump is at maximum pressure) before being transmitted via conductor 11 to the multiplier circuit 13.

Also appended to pump 1 is a d.c. tachogenerator 4 that provides a speed analog signal which is proportional to the speed at which the pump 1 is operating. This speed analog signal is transmitted by conductor 6 to filter 8, which operates in a similar manner to filter 7 described above.

The filtered speed analog signal is applied to poteniometer 10 where it is scaled to a suitable value (usually 3.16 volts when the pump is operated at maximum speed) before being applied via wire 12 to the multiplier 13.

Multiplier 13 is an analog device well known to those skilled in the art and whose output is a function of the product of two inputs. One such multiplier device is the model MC1594L multiplier circuit manufactured by Motorola Semiconductor Products, Inc., Box 20912, Phoenix, Arizona 85036.

Alternately, multiplication of the speed and pressure analog signals may be accomplished by the use of a Hall Effect Device, a device also well known to those skilled in the art. One such device is the model HQ3150 multiplier manufactured by F. W. Bell, Inc. 4949 Freeway Drive E, Columbus, Ohio 43229.

The output of the multiplier 13, (normally a d.c. voltage between 0 and 10 volts which represents the product of the speed and pressure scaled analogs) is applied through conductor 14 to the input of a voltage to frequency converter 15.

The voltage-to-frequency converter generates a square wave the frequency of which is proportional to the input voltage. The range of the frequency is defined by the R.C. time constant 18 which is connected to the voltage-to-frequency converter 15 by conductor 17. The voltage-to-frequency converter is a device well known to those skilled in the art. One such device is the type RM4151 manufactured by Raytheon Semiconductor Division, 350 Ellis Street, Mountain View, California 94092.

The voltage-to-frequency converter 15 has frequency range set by th R.C. time constant (18) such that its output is 1000 Hz for each 1000 horsepower output of the pump, or, depending on the size of the pump, some other convenient frequency. The output of the voltage-to-frequency converter 15 is coupled to the divider 19 via conductor 16.

The divider 19 is comprised of a circuit which divides the frequency presented by the voltage-to-frequency converter 15 by a fixed constant. If the output of the voltage-to-frequency converter is 1000 Hz per 1000 pump horsepower, for example, then the divider circuit may be preset to divide by 36000, thus producing 100 cycles per hour for an input of 1000 horesepower from the pump. The divider circuit described above is well known to those skilled in the art, and is constructed of three type DM7490 divider circuits and two type DM7492 divider circuits such as are manufactured by the National Semiconductor Corporation, 2900 Semiconductor Drive, Santa Clara, California 95051. These divider circuits are connected in series such that each DM7490 divider circuit divides its input frequency by ten, and one of the DM7492 divider circuits divides by twelve while the second DM7492 circuit divides by three. The output of the divider circuits (which is the input frequency divided by 36,000) is applied to the amplifier circuit 21 by conductor 20. The amplifier circuit 21 increases the voltage of the square wave from the divider 19 as required to operate the electrical impulse counter 23. The impulse counter is a device well known to those skilled in the art. One such device is the SODECO model RE661, manufactured by SODECO, 4 Westchester Plaza, Elmsford, New York 10523.

The digital counter 23 records and displays horsepower hours multiplied by 10, or another convenient quantity, depending upon how the constants (which include the scaling potentiometers 9 and 10, the RC time constant 18, and the divider 19) are adjusted within the circuitry.

The specific nature of the circuitry set forth in FIG. 1 and described above is intended for purposes of illustration only and is not to be taken as limiting the scope of the present invention, it being obvious that other suitable circuitry may be employed within the spirit and scope of this invention to detect the expected work induced wear of mechanical devices.

It is well known that the wear experienced by various components of an oilfield mud pump is the product of three variables, namely speed, fluid pressure, and time. The product of speed and time is, of course, distance. Thus, it is possible to derive the product of three variables while only two variables are actually measured; to wit, pressure and distance. It is upon this principle that this embodiment of the invention is based.

In the piston type pump, the piston moves a fixed distance for each stroke. Thus to totalize work for the pump, it is required only to multiply strokes by pressure.

Figure 2:
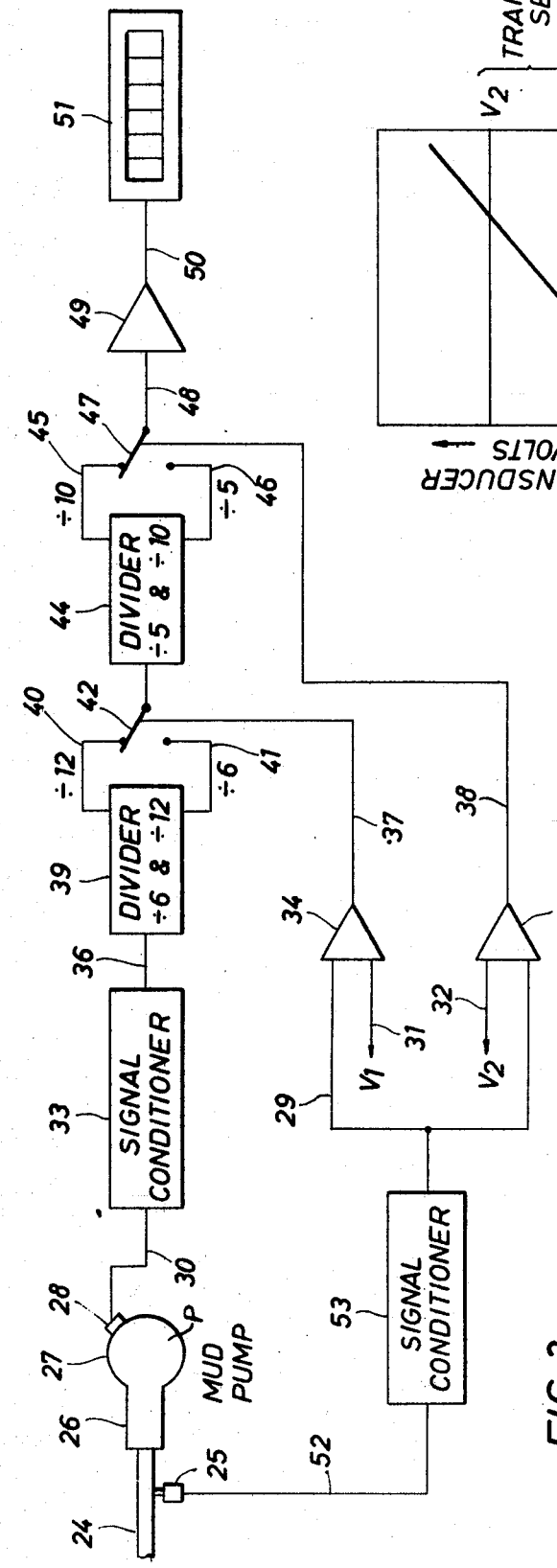

Referring now to FIG. 2, there is shown another of the preferred embodiments of the invention. The mud pump P, consisting of power end 27 and fluid end 26, discharges high pressure drilling fluid through line 24. Appended onto the power end 27 is a mechanically operated switch 28 whose contacts are closed once for each stroke (revolution) of the pump P.

The signal from switch 28 is conveyed via conductor 30 to a signal conditioner 33, which is a device well known to those skilled in the art, that may consist of an LC filter to remove unwanted noise, and a circuit to eliminate any bouncing of the contacts of switch 28. The signal, thus free of noise, and with any contact bounce removed, is passed along a conductor 36 to divider circuit 39. The circuit 39 is a commercially available unit well known to those skilled in the art. One such unit is the DM7492 divider circuit manufactured by the National Semiconductor Corportion, 2900 Semiconductor Drive, Santa Clara, California 95051.

Two outputs are provided from the divider 39; one output from conductor 40 yields one output cycle for every twelfth stroke (input cycle) of the pump. The divider output signal from conductor 41 yields one output cycle for every sixth stroke (cycle) of the pump. Output conductor 40 is connected to the normally closed contacts of a single pole double throw relay, 42 while output conductor 41 is connected to the normally open pole of the same relay. The relay 42 may be of the electromechanical type, or it may be of a solid state type consisting of electronic gates such as is familiar to those skilled in the art.

The common pole of the relay 42 is connected to the input of the second divider 44 by conductor 43. Divider circuit 44 is a circuit unit that is well known to those skilled in the art. One such divider circuit is the DM7490 divider circuit manufactured by National Semiconductor Corporation, 2900 Semiconductor Drive, Santa Clara, California 95051.

The second divider circuit 44 has two output conductors 45 and 46 yielding two output signals. The signal from output conductor 45 provides an output cycle for each 10 input cycles. This output conductor 45 is connected to the normally closed contacts of a single pole double throw relay 47, similar to relay 42. Connected to the normally open contacts of relay 45 is a divider conductor 46 from divider circuit 44 which yields a signal that cycles once for each five input cycles.

The common pole of relay 47 is connected by conductor 48 to an amplifier circuit 49, which raises the voltage of the signal from divider output conductor 44 sufficiently to actuate an electrical counter 51 via conductor 50. The electrical counter 51 is familiar to those skilled in the art. One such counter is the SODECO model RE661 digital counter manufactured by the SODECO Company, 4 Westchester Plaza, Elmsford, New York 10523. The counter 51 is set to display hundreds of wear units and functions to update its display once for each cycle of the divider circuit 44. The counter 51 may also take any other acceptable form without departing from the spirit and scope of this invention.

As shown in the block electrical schematic diagram, it will be obvious that, with relays 42 and 47 in the normal, or de-energized state as shown, and since divider circuit 39 will produce one output cycle for each 12 strokes of the pump, and divider circuit 44 will produce one output cycle for each 10 input cycles, and since the counter 51 is updated once for each output cycle from divider circuit 44, the counter 51 will be updated once for each 120 strokes or cycles of the pump.

If relay 42 is energized, the counter will become updated once for each 60 pump strokes.

If both relay 42 and relay 47 are energized, the counter will become updated once for each 30 pump strokes.

The relays are energized in a sequence such as is described above in response to pressure variations in the pump P discharge pressure. This is accomplished as follows:

Referring again to FIG. 2, the pressure at the discharge line 24 is measured by pressure transducer 25, which converts the pressure reading to a proportional d.c. voltage analogous to the pressure. Pressure transducers of this type are well known to those skilled in the art. One such pressure transducer is the type DV high output transducer, manufactured by BLH Electronics, 92 Fourth Avenue, Waltham, Mass. 02159.

The pressure analog signal is conveyed to a signal conditioner circuit 53 via conductor 52. The signal conditioner circuit may consist of a LC network low pass filter to remove noise and transient phenomena which may be present on the conductor 52 by induction or otherwise. The signal conditioner circuit also contains a simple RC averaging network which serves to average the pressure analog signal over an approximate 3 second period, thus eliminating pulsations characteristic of piston type pumps.

The output signal of the signal conditioner circuit 53 is fed via conductor 29 to the input of two voltage comparator circuits 34 and 35. Voltage comparator circuits are devices well known to those skilled in the art which have two inputs and one output. One of the inputs is normally connected to a reference voltage, the other to a variable voltage. The nature of voltage comparator circuits is such that so long as the variable voltage is less than the reference voltage, the output of the circuit has one particular state. When the variable voltage is greater than the reference voltage, the output exhibits the opposite state.

In the case of the invention, two such comparator circuits are typically employed. These comparator circuits may be in the form of operational amplifiers in the open loop mode, arranged such that their output state change switches the relays 42 and 47, thus changing the rate of division of the circuit.

One suitable type of voltage comparator circuit that may be effectively employed may conveniently take the form of type LM3900N quad operational amplifier circuits manufactured by the National Semiconductor Corporation, 2900 Semiconductor Drive, Santa Clara, California 95051.

Comparator circuit 34 has its reference input conductor 31 connected to an adjustable reference voltage V1 provided by the system power supply (not shown). This reference voltage V1 is fixed at a value which represents about one-third of the pump P maximum output pressure or any other selected value. The output of the comparator circuit 34 is connected to operate relay 42 by means of conductor 37.

Comparator circuit 35 has its reference input conductor 32 connected to a second adjustable reference voltage V2 also provided by the system power supply. This reference voltage V2 is fixed at a value which represents about two-thirds of the maximum output pressure of the pump P or any other selected value. The output of the comparator circuit 35 is connected by conductor 38 to operate relay 47.

The operation of the system of FIG. 2 is summarized as follows:

The pump rear depends upon the output pressure and the number of cycles. The pump pressure is divided into three ranges, to-wit, low, medium, and high. Assuming the the pump P is operating at low pressure, both relays 42 and 47 will be in the normal position and the counter 51 will be updated every 120 strokes of the pump.

If the pump P operating at medium or normal pressure, relay 42 will be energized responsive to the condition of circuit 34 and the counter 51 will be updated every 60 strokes of the pump.

If the pump is operating at high pressure, the relay 47 will also be energized responsive to the condition of circuit 35 and the counter 51 will be updated every 30 strokes of the pump P.

In this way the circuitry of the present invention totalizes or records the work to which the pump P is subjected. Since wear is a function of work, the wear to which the pump P is subjected is indicated on the digital counter 51.

Figure 3:
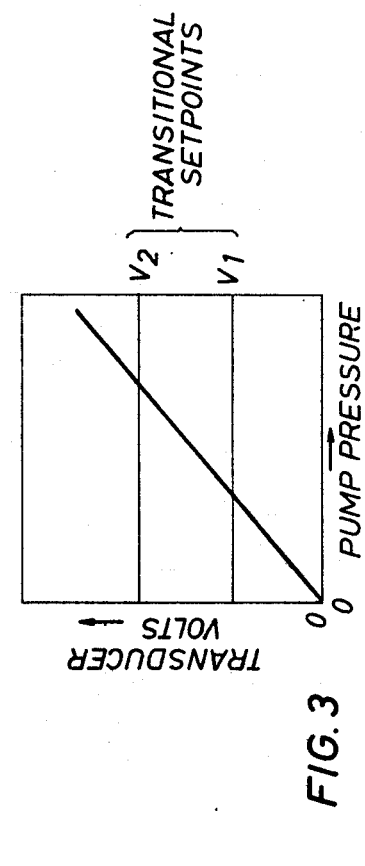

Referring now to FIG. 3, there is depicted in graphical form the pressure transducer performance correlated with the transitional set points established by reference voltages V1 and V2 of FIG. 2. Transducer voltage is shown in the vertical components of the graph while pump pressure is shown horizontally. The reference voltages V1 and V2 are fixed and indicated by the horizontal lines V1 and V2. It is clear from the simple graphical representation of FIG. 3 that transducer voltage and pump pressure are directly proportional. As the transducer voltage exceeds the reference voltages established at V1 and V2 the voltage comparator circuits 34 and 35 will become selectively triggered, thus resulting in selective energization of the relays 42 and 47 that activate selective division by the divider circuits 33 and 39.

Although the circuitry set forth herein has been described in considerable detail, this particular circuitry is not intended to limit the scope of the invention in any manner whatever. Other circuit components may be employed equally well to obtain positive and accurate results reflecting operational wear of a mechanical device.

In view of the foregoing, it is clearly apparent that the present invention encompasses a novel method and apparatus for accurately detecting the amount of wear that may have occurred during operation of a mechanical device which is subjected to a plurality of wear inducing factors. The circuitry converts each of the plurality of wear inducing factors into discrete electrical signals and processes these signals to arrive at a total indication of the wear that has occurred. The signals representing the various wear inducing factors are electronically processed in such manner that the indicia of the recorder displays at all times the work that has been done by the machine to which the transducers are connected. Since wear is directly proportional to work, the recorder also displays the accumulated amount of expected wear that has occurred. This information may be used by the operating personnel to determine an efficient time for the periodic maintenance that is necessary for proper operation and long life of the equipment involved.

It is therefore apparent that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. Apparatus for measurement of expected wear of mechanisms that are subjected to a plurality of wear inducing factors, said apparatus comprising:
    detecting means for detecting each of said plurality of wear inducing factors during operation of said mechanisms and for converting the condition of said wear inducing factors into a plurality of electrical analog signals;
    divider means receiving at least one of said analog signals and selectively dividing said analog signals by preset numbers;
    an electrical counter capable of presenting a cumulative display;
    electrical signal processing means for multiplying said plurality of selectively divided electrical analog signals to obtain a product signal and modifying said product signal for operation of said electrical counter, said electrical counter providing a cumulative display responsive to cumulation of said product signals.

2. Apparatus for measurement of expected wear of mechanisms as recited in claim 1, wherein said detecting means comprises:
    a plurality of transducers, said transducers each detecting one of said wear inducing factors and providing electrical signals responsive to the particular wear inducing factor being detected.

3. Apparatus for measurement of expected wear of mechanisms as recited in claim 2, wherein:
    said electrical counter is a digital counter; and
    said electrical signal processing means comprises electrical circuit means for receiving analog signals from said transducers and converting said analog signals into appropriate signals for operating said digital counter means.

4. Apparatus for measurement of expected wear of mechanisms that are subjected to a plurality of wear inducing factors, said apparatus comprising:
    a plurality of transducers each detecting one of said plurality of wear inducing factors during operation of said mechanisms and providing an electrical transducer signal responsive to the condition of each of said wear inducing factors;
    divider means receiving at least one of said transducer signals and selectively dividing said transducer signals by preset numbers;
    comparator means functioning responsive to one of said plurality of wear inducing factors for automatically controlling selective division by said divider means; and
    wear signal display means receiving signals from said divider means and providing a cumulative display of signals from said divider means.

5. Apparatus for measurement of expected wear of mechanisms as recited in claim 4, wherein:
    said divider means include relay means for control of the selection thereof; and
    said comparator means functions to control the selective position of said relay means responsive to at least one of said transducer signals.

6. Apparatus for measurement of expected wear of mechanisms as recited in claim 4, wherein:
    said divider means include switching means for control of the selection thereof; and
    said comparator means functions to control the selective condition of said switching means responsive to at least one of said transducer signals.

7. Apparatus for measurement of expected wear of mechanisms as recited in claim 4, wherein:
    said divider means comprise a plurality of divider circuits connectable in series, each of said means being capable of selectively dividing the input signal thereof by preset numbers;
    switching means controlling the selective division of each of said divider circuits; and
    a plurality of comparator circuits receiving the output signal of one of said transducers and comparing said output signal with reference signal means, the output of said comparator circuits being coupled to said switching means and said switching means being controlled by the output signals of said comparator circuits.

8. Apparatus for measurement of expected wear of mechanisms as recited in claim 7, wherein:
amplifier means is coupled between the output of said divider means and the input of said wear signal display means, said amplifier means increasing the voltage of said output of said divider means sufficiently for operation of said wear signal display means.

9. Apparatus for measurement of expected wear of mechanisms as recited in claim 8, wherein:
said wear signal display means comprises a digital counter device for displaying an accumulated total of the amplified signals from said divider means.

10. Apparatus for measurement of expected wear of mechanisms as recited in claim 9, wherein:
signal conditioner means is coupled to said plurality of transducer means, said signal conditioner means reducing extraneous noise and signals from said transducer circuits, said signal conditioner means being coupled to said divider means and to said comparator means.

11. Apparatus for measurement of expected wear of mechanisms that are subjected to a plurality of wear inducing factors, said apparatus comprising:
detecting means for detecting each of said wear inducing factors during operation of said mechanism and for converting the condition of said wear inducing factors into a plurality of electrical analog signals responsive to each of said plurality of wear inducing factors;
an electrical counter capable of presenting a cumulative display;
electrical signal processing means for multiplying said plurality of electrical analog signals to obtain a product signal and modifying said product signal for operation of said electrical counter, said electrical counter providing a cumulative display responsive to cumulation of said product signals;
converter means being coupled to said detecting means and converting said analog signals to a form acceptable for reception by said display means, said converted analog signals being accumulated and displayed by said display means; and
multiplier means being coupled between said detecting means and said converter means, said multiplier means receiving the output of said detecting means and providing a converter input, said converter input being the product of the analog signals from said detecting means.

12. Apparatus for measurement of expected wear of mechanisms as recited in claim 11, wherein:
divider means is coupled between said converter means and said wear signal display means and being operative to divide the output frequency of said converter means by a fixed constant.

13. Apparatus for measurement of expected wear of mechanisms as recited in claim 12, wherein:
amplifier means is coupled between said divider means and said signal display means and increases the voltage of said divider output signals sufficiently for operation of said wear signal display means.

14. Apparatus for measurement of expected wear of mechanisms as recited in claim 13, wherein:
scaling means is coupled between said detector means and said multiplier means for scaling the output signal of said detector means for operative reception by said multiplier means.

15. Apparatus for measurement of expected wear of mechanisms as recited in claim 14, wherein:
filter means is coupled between said detecting means and said multiplier means for rejecting noise and other high frequency phenomena while passing the analog signals from said detecting means.

16. Apparatus for measurement of expected wear of mechanisms that are subjected to wear inducing factors, including fluid pressure and cycles of operation, said apparatus comprising:
separate detecting means for detecting said cycles of operation and pressure of wear inducing factors during operation of said mechanisms and for converting said cycles of operation and pressure into electrical analog signals that represent cycles of operation and represent pressure;
divider means receiving at least one of said analog signals and selectively dividing said analog signals by preset numbers;
an electrical counter capable of presenting a cumulative display;
electrical signal processing means for multiplying aid plurality of selectively divided electrical analog signals to obtain a product signal and modifying said product signal for operation of said electrical counter, said electrical counter providing a cumulative display responsive to cumulation of said product signals.

* * * * *